(12) United States Patent
Keeler et al.

(10) Patent No.: US 6,957,203 B2
(45) Date of Patent: Oct. 18, 2005

(54) METHOD AND APPARATUS FOR OPERATING A NEURAL NETWORK WITH MISSING AND/OR INCOMPLETE DATA

(75) Inventors: James David Keeler, Austin, TX (US);
Eric Jon Hartman, Austin, TX (US);
Ralph Bruce Ferguson, Austin, TX (US)

(73) Assignee: Pavilion Technologies, Austin, TX (US)

( * ) Notice: Subject to any disclaimer, the term of this patent is extended or adjusted under 35 U.S.C. 154(b) by 0 days.

(21) Appl. No.: 10/614,335

(22) Filed: Jul. 7, 2003

(65) Prior Publication Data

US 2004/0133533 A1 Jul. 8, 2004

Related U.S. Application Data

(63) Continuation of application No. 10/040,085, filed on Nov. 6, 2001, now Pat. No. 6,591,254, which is a continuation of application No. 09/207,719, filed on Dec. 8, 1998, now Pat. No. 6,314,414, which is a continuation of application No. 09/167,400, filed on Oct. 6, 1998, now Pat. No. 6,169,980, which is a continuation of application No. 08/724,377, filed on Oct. 1, 1996, now Pat. No. 5,819,006, which is a continuation of application No. 08/531,100, filed on Sep. 20, 1995, now Pat. No. 5,613,041.

(51) Int. Cl.[7] .............................................. G06F 15/18

(52) U.S. Cl. .......................................... 706/21; 706/22
(58) Field of Search ..................................... 706/21, 22

(56) References Cited

U.S. PATENT DOCUMENTS

| 4,802,103 A | 1/1989 | Faggin et al. |
| 4,813,077 A | 3/1989 | Woods et al. |
| 4,872,122 A | 10/1989 | Altschuler et al. |

(Continued)

FOREIGN PATENT DOCUMENTS

| EP | 0262647 A3 | 4/1988 |
| EP | 0327268 A2 | 8/1989 |
| EP | 0436916 A2 | 7/1991 |
| WO | WO 94/12948 | 6/1994 |
| WO | WO 94/17482 | 8/1994 |
| WO | WO 94/17489 | 8/1994 |

OTHER PUBLICATIONS

Phoha, Shashi; "Using. the National Information Infrastructure (NII) for Monitoring, Diagnostics and Prognostics of Operating Machinery," IEEE Proceedings of the 35th Conference on Decision and Control, Kobe, Japan, pp. 2583–2587, Dec. 1996.

(Continued)

*Primary Examiner*—George Davis
(74) *Attorney, Agent, or Firm*—Howison & Arnott, L.L.P.

(57) ABSTRACT

A neural network system is provided that models the system in a system model (12) with the output thereof providing a predicted output. This predicted output is modified or controlled by an output control (14). Input data is processed in a data preprocess step (10) to reconcile the data for input to the system model (12). Additionally, the error resulted from the reconciliation is input to an uncertainty model to predict the uncertainty in the predicted output. This is input to a decision processor (20) which is utilized to control the output control (14). The output control (14) is controlled to either vary the predicted output or to inhibit the predicted output whenever the output of the uncertainty model (18) exceeds a predetermined decision threshold, input by a decision threshold block (22). Additionally, a validity model (16) is also provided which represents the reliability or validity of the output as a function of the number of data points in a given data region during training of the system model (12). This predicts the confidence in the predicted output which is also input to the decision processor (20). The decision processor (20) therefore bases its decision on the predicted confidence and the predicted uncertainty. Additionally, the uncertainty output by the data preprocess block (10) can be utilized to train the system model (12).

20 Claims, 7 Drawing Sheets

U.S. PATENT DOCUMENTS

| | | |
|---|---|---|
| 4,910,691 A | 3/1990 | Skeirik |
| 4,965,742 A | 10/1990 | Skeirik |
| 5,006,992 A | 4/1991 | Skeirik |
| 5,052,043 A | 9/1991 | Gaborski |
| 5,081,651 A | 1/1992 | Kubo |
| 5,111,531 A | 5/1992 | Grayson et al. |
| 5,113,483 A | 5/1992 | Keeler et al. |
| 5,121,467 A | 6/1992 | Skeirik |
| 5,140,523 A | 8/1992 | Frankel et al. |
| 5,150,313 A | 9/1992 | van den Engh et al. |
| 5,175,797 A | 12/1992 | Funabashi et al. |
| 5,255,347 A | 10/1993 | Matsuba et al. |
| 5,276,771 A | 1/1994 | Manukian et al. |
| 5,335,291 A | 8/1994 | Kramer et al. |
| 5,353,207 A | 10/1994 | Keeler et al. |
| 5,402,519 A | 3/1995 | Inoue et al. |
| 5,444,820 A | 8/1995 | Tzes et al. |
| 5,461,699 A | 10/1995 | Arbabi et al. |
| 5,467,428 A | 11/1995 | Ulug |
| 5,479,573 A | 12/1995 | Keeler et al. |
| 5,559,690 A | 9/1996 | Keeler et al. |
| 5,581,459 A | 12/1996 | Enbutsu et al. |
| 5,613,041 A | 3/1997 | Keeler et al. |
| 5,659,667 A | 8/1997 | Buescher et al. |
| 5,704,011 A | 12/1997 | Hansen et al. |
| 5,720,003 A | 2/1998 | Chiang et al. |
| 5,729,661 A | 3/1998 | Keeler et al. |
| 5,819,006 A | 10/1998 | Keeler et al. |
| 6,002,839 A | 12/1999 | Keeler et al. |
| 6,169,980 B1 | 1/2001 | Keeler et al. |
| 6,314,414 B1 | 11/2001 | Keeler et al. |
| 6,591,254 B1 * | 7/2003 | Keeler et al. .................. 706/21 |

OTHER PUBLICATIONS

Hartman, Eric J., Keeler James D., Kowalski, Jacek M.; "Layered Neural Networks with Gaussian Hidden Units as Universal Approximations," Neural Computation 2, 1990, Massachusetts Institute of Technology, pp. 210–215.

Hartman, Eric, Keeler, James D.; "Predicting the Future: Advantages of Semilocal Units," Neural Computation 3, 1991, Massachusetts Institute of Technology, pp. 566–578.

Press, William H., Flannery, Brian P., Teukolsky, Saul A., Vetterling, William T.; Numerical Recipes: The Art of Scientific Computing, 1986, ch. 3, "Interpolation and Extrapolation," pp. 77–101.

Serth, R.W., Heenan, W. A.; "Gross Error Detection and Data Reconciliation in Sleam–Metering Systems," AIChE Journal, vol. 32, No. 5, May 1986, pp. 733–742.

Myung–Sub Roh et al.; Thermal Power Prediction of Nuclear Power Plant Using Neural Network and Parity Space Model, IEEE Transactions on Nuclear Science, vol. 38, No. 2, Apr. 1991, pp. 866–872.

Autere, Antti: On Correcting Systematic Errors Without Analyzing Them by Performing a Repetitive Task, IEEE / RSI International Workshop on Intelligent Robots and Systems IROS '91, Nov. 3–5, 1991, pp. 472–477.

Kimoto, Takashi et al.; Stock Market Prediction System with Modular Neural Networks, IEEE, Jun. 1990, pp. I–1 to I–6.

Dorronsoro et al.; "Neural Fraud Detection in Credit Card Operations," IEEE Transactions on Neural Networks, vol. 8, No. 4, Jul. 1997, pp. 827–834.

Spenceley, S.E., Warren, J.R.; "The Intelligent Interface for Online Electronic Medical Records Using Temporal Data Mining." IEEE Xplore, Proceedings of the 31st Annual Hawaii, International Conference on System Sciences. Jan. 1998, pp. 266–745.

Koutsougeras; "A feedforward neural network classifier model: multiple classes, confidence output values, and implementation," International Journal of Pattern Recognition and Artificial Intelligence Ed. World Scientific Publishing Co., Oct. 1992, vol. 6, No. 4, pp. 539–569.

Lapedes, Alan, Farber, Robert; "How Neural Nets Work," American Inst. of Physics, 1988, pp. 442–457.

Weigend, Andreas S., Huberman, Bernardo A., Rumelhart, David E; "Predicting the Future: A Connectionist Approach," Stanford Univeristy, Stanford–PDP–90–01/PARC–SSL–90–20, Apr. 1990.

Rumelhart, D.E., Hinton, G.E., Williams. R.J.; "Learning Internal Representations by error Propagation," Parallel Distributed Processing, vol. 1, 1986.

Rander, P.W., Unnikrishnan, K.P.; "Learning the Time–Delay Characteristics in a Neural Network," ICAAADDP–92–IEEE International Conference on Acoustics, Speech and Signal Processing, Mar. 23, 1992, vol. 2, pp. 285–288.

Tam, David C., Perkel, Donald H.; "A Model for Temporal Correlation of biological Neuronal Spike Trains," IJCNN INI. Joint Conference of Neural Networks, Dept. of Physiology and Biophysics, University of California, pp. I–781–I–786.

Levin, Esther, Gewirtzman, Raanan, Inbar, Gideon F.; "Neural Network Architecture for Adaptive System Modeling and Control," Neural Networks, 4(1991) No. 2, pp. 185–191.

Troudet, T., Garg, S., Mattern, D. Merrill, W.; "Towards Practical Control Design Using Neural Computation," ICJNN–91–Seattle–International Joint Conference on Neural Networks, vol. 2, pp. 675–681, Jul. 8, 1991.

Beerhold, J.R., Jansen, M., Eckmiller, R.; "Pulse–Processing Neural Net Hardware with Selectable Topology and Adaptive Weights and Delays," IJCNN International Joint Conference on Neural Networks, Jun. 17, 1990, vol. 2, pp. 569–574.

Haffner, Patrick, Franzini, Michael, Waibel, Alex; "Integrating Time Alignment and Neural Networks for High performance Continuous Speech Recognition," ICASSP 91, sponsored by the Inst. of electrical and Electronics Engineers, Signal Processing Society, 1991 Int. Conf. on Acoustics, Speech and Signal Processing, May 14–17, 1991, pp. 105–108.

* cited by examiner

METHOD AND APPARATUS FOR OPERATING A NEURAL NETWORK WITH MISSING AND/OR INCOMPLETE DATA

CROSS-REFERENCE TO RELATED APPLICATIONS

This application is a continuation of U.S. Ser. No. 10/040,085 filed on Nov. 6, 2001, now U.S. Pat. No. 6,591,254, to issue Jul. 8, 2003, entitled "Method and Apparatus for Operating a Neural Network with Missing And/or Incomplete Data", which is a continuation of U.S. Ser. No. 09/207,719 filed Dec. 8, 1998, now U.S. Pat. No. 6,314,414, issued Nov. 6, 2001, entitled "Method For Operating a Neural Network With Missing and/or Incomplete Data", which is a continuation of U.S. Ser. No. 09/167,400 filed Oct. 6, 1998, now U.S. Pat. No. 6,169,980 issued Jan. 2, 2001, entitled "Method for Training and/or Testing a Neural Network on Missing and/or Incomplete Data", which is a continuation of U.S. Ser. No. 08/724,377 filed on Oct. 1, 1996, now U.S. Pat. No. 5,819,006, issued Oct. 6, 1998, entitled "Method for Operating a Neural Network with Missing and/or Incomplete Data", which is a continuation of U.S. Ser. No. 08/531,100 filed Sep. 20, 1995, now U.S. Pat. No. 5,613,041, issued Mar. 18, 1997, entitled "Method and Apparatus for Operating a Neural Network With Missing and/or Incomplete Data."

TECHNICAL FIELD OF THE INVENTION

The present invention pertains in general to neural networks, and more particularly, to methods for estimating the accuracy of a trained neural network model, for determining the validity of the neural network's prediction, and for training neural networks having missing data in the input pattern and generating information as to the uncertainty in the data, this uncertainty utilized to control the output of the neural network.

BACKGROUND OF THE INVENTION

A common problem that is encountered in training neural networks for prediction, forecasting, pattern recognition, sensor validation and/or processing problems is that some of the training/testing patterns might be missing, corrupted, and/or incomplete. Prior systems merely discarded data with the result that some areas of the input space may not have been covered during training of the neural network. For example, if the network is utilized to learn the behavior of a chemical plant as a function of the historical sensor and control settings, these sensor readings are typically sampled electronically, entered by hand from gauge readings and/or entered by hand from laboratory results. It is a common occurrence that some or all of these readings may be missing at a given time. It is also common that the various values may be sampled on different time intervals. Additionally, any one value may be "bad" in the sense that after the value is entered, it may be determined by some method that a data item was, in fact, incorrect. Hence, if the data were plotted in a table, the result would be a partially filled-in table with intermittent missing data or "holes", these being reminiscent of the holes in Swiss cheese. These "holes" correspond to "bad" or "missing" data. The "Swiss-cheese" data table described above occurs quite often in real-world problems.

Conventional neural network training and testing methods require complete patterns such that they are required to discard patterns with missing or bad data. The deletion of the bad data in this manner is an inefficient method for training a neural network. For example, suppose that a neural network has ten inputs and ten outputs, and also suppose that one of the inputs or outputs happens to be missing at the desired time for fifty percent or more of the training patterns. Conventional methods would discard these patterns, leading to training for those patterns during the training mode and no reliable predicted output during the run mode. This is inefficient, considering that for this case more than ninety percent of the information is still there for the patterns that conventional methods would discard. The predicted output corresponding to those certain areas will be somewhat ambiguous and erroneous. In some situations, there may be as much as a 50% reduction in the overall data after screening bad or missing data. Additionally, experimental results have shown that neural network testing performance generally increases with more training data, such that throwing away bad or incomplete data decreases the overall performance of the neural network.

If a neural network is trained on a smaller amount of data, this decreases the overall confidence that one has in the predicted output. To date, no technique exists for predicting the integrity of the training operation of the network "on the fly" during the run mode. For each input data pattern in the input space, the neural network has a training integrity. If, for example, a large number of good data points existed during the training, a high confidence level would exist when the input data occurred in that region. However, if there were a region of the input space that was sparsely populated with good data, e.g., a large amount of bad data had been thrown out from there, the confidence level in the predicted output of a network would be very low. Although some prior techniques may exist for actually checking the actual training of the network, these techniques do not operate in a real-time run mode.

SUMMARY OF THE INVENTION

The present invention disclosed and claimed herein comprises a network for estimating the error in the prediction output space of a predictive system model for a prediction input space. The network includes an input for receiving an input vector comprising a plurality of input values that occupy the prediction input space. An output is operable to output an output prediction error vector that occupies an output space corresponding to the prediction output space of the system model. A processing layer maps the input space to the output space through a representation of the prediction error in the system model to provide said output prediction error vector.

In another aspect of the present invention, a data preprocessor is provided. The data preprocessor is operable to receive an unprocessed data input vector that is associated with substantially the same input space as the input vector. The unprocessed data input vector has associated therewith errors in certain portions of the input space. The preprocessor is operable to process the unprocessed data input vector to minimize the errors therein to provide the input vector on an output. The unprocessed data input in one embodiment is comprised of data having portions thereof that are unusable. The data preprocessor is operable to reconcile the unprocessed data to replace the unusable portion with reconciled data. Additionally, the data preprocessor is operable to output an uncertainty value for each value of the reconciled data that is output as the input vector.

In a further aspect of the present invention, the system model is comprised of a non-linear model having an input for receiving the input vector within the input space and an output for outputting a predicted output vector. A mapping function is provided that maps the input layer to the output layer for a non-linear model of a system. A control circuit is provided for controlling the prediction output vector such that a change can be effected therein in accordance with predetermined criteria. A plurality of decision thresholds are provided that define predetermined threshold rates for the prediction error output. A decision processor is operable to compare the output prediction error vector with the decision thresholds and operate the output control to effect the predetermined changes whenever a predetermined relationship exists between the decision thresholds and the output prediction error vector.

In an even further aspect of the present invention, the non-linear representation of the system model is a trained representation that is trained on a finite set of input data within the input space. A validity model is provided that yields a representation of the validity of the predicted output of a system model for a given value in the input space. The validity model includes an input for receiving the input vector with an input space and an output for outputting a validity output vector corresponding to the output space. A processor is operable to generate the validity output vector in response to input of a predetermined value of the input vector and the location of the input vector within the input space. The value of the validity output vector corresponds to the relative amount of training data on which the system model was trained in the region of the input space about the value of the input vector.

In a yet further aspect of the present invention, the system model is trained by a predetermined training algorithm that utilizes a target output and a set of training data. During training, an uncertainty value is also received, representing the uncertainty of the input data. The training algorithm is modified during training as a function of the uncertainty value.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
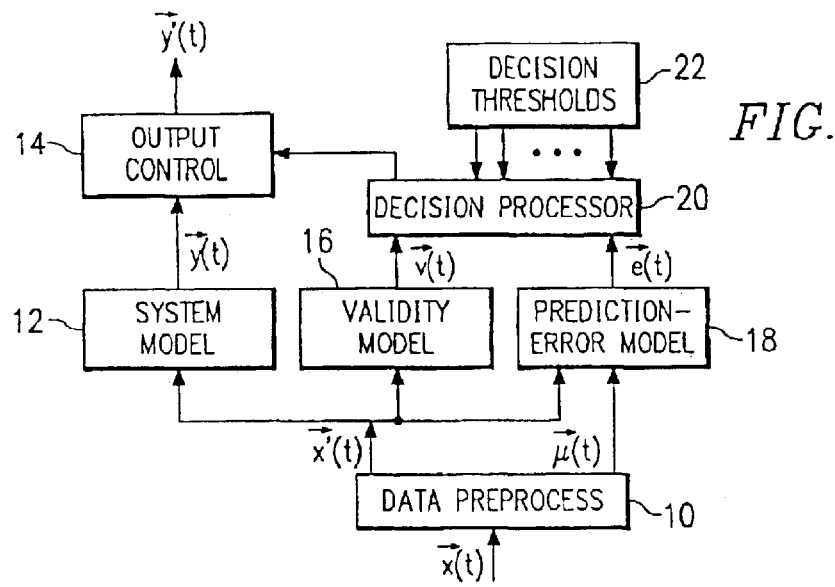
FIG. 1 illustrates an overall block diagram of the system model illustrating both a validity model and a prediction error model to process reconciled data and control the output with the use of the validity model and prediction error model.

In FIG. 1, there is illustrated an overall block diagram of the system of the present invention. A data input vector x(t) is provided that represents the input data occupying an input space. This data can have missing or bad data which must be replaced. This data replacement occurs in a data preprocess section 10, which is operable to reconcile the data patterns to fill in the bad or missing data and provide an output x'(t) vector. Additionally, the error or uncertainty vector $\mu_x(t)$ is output. This represents the distribution of the data about the average reconciled data vector x'(t), and this is typically what is discarded in prior systems. The reconciled data x'(t) is input to a system model 12, which is realized with a neural network. The neural network is a conventional neural network that is comprised of an input layer for receiving the input vector and an output layer for providing a predicted output vector. The input layer is mapped to the output layer through a non-linear mapping function that is embodied in one or more hidden layers. This is a conventional type of architecture. As will be described hereinbelow, this network is trained through any one of a number of training algorithms and architectures such as Radial Basis Functions, Gaussian Bars, or conventional Backpropagation techniques. The Backpropagation learning technique is generally described in D. E. Rumelhart, G. E. Hinton & R. J. Williams, *Learning Internal Representations by Error Propagation* (in D. E. Rumelhart & J. L. McClennand, *Parallel Distributed Processing*, Chapter 8, Vol. 1, 1986), which document is incorporated herein by reference. However, Backpropagation techniques for training conventional neural networks is well known. The output of the system model 12 is a predicted output y(t). This is input to an output control circuit 14, which provides as an output a modified output vector y'(t). In general, whenever data is input to the system model 12, a predicted output results, the integrity thereof being a function of how well the network is trained.

In addition to the system model, a validity model 16 and a prediction-error model 18 are provided. The validity model 16 provides a model of the "validity" of the predicted output as a function of the "distribution" of data in the input space during the training operation. Any system model has given prediction errors associated therewith, which prediction errors are inherent in the architecture utilized. This assumes that the system model was trained with an adequate training data set. If not, then an additional source of error exists that is due to an inadequate distribution of training data at the location in the input space proximate to the input data. The validity model 16 provides a measure of this additional source of error. The prediction-error model 18 provides a model of the expected error of the predicted output.

A given system model has an associated prediction error which is a function of the architecture, which prediction error is premised upon an adequate set of training data over the entire input space. However, if there is an error or uncertainty associated with the set of training data, this error or uncertainty is additive to the inherent prediction error of the system model. The overall prediction error is distinguished from the validity in that validity is a function of the distribution of the training data over the input space and the prediction error is a function of the architecture of the system model and the associated error or uncertainty of the set of training data.

The output of the validity model 16 provides a validity output vector v(t), and the output of the prediction error model 18 provides an estimated prediction error vector e(t). These two output vectors are input to a decision processor 20, which output is used to generate a control signal for input to the output control 14. The decision processor 20 is operable to compare the output vectors v(t) and e(t) with the various decision thresholds which are input thereto from a decision threshold generator 22. Examples of the type of control that are provided are: if the accuracy is less than a control change recommendation, then no change is made. Otherwise, the controls are changed to the recommended value. Similarly, if the validity value is greater than the validity threshold, then the control recommendation is accepted. Otherwise, the control recommendation is not accepted. The output control 14 could also modify the predicted outputs. For example, in a control situation, an output control change value could be modified to result in only 50% of the change value for a given threshold, 25% of the change value for a second threshold and 0% of the change value for a third threshold.

Figure 2A:
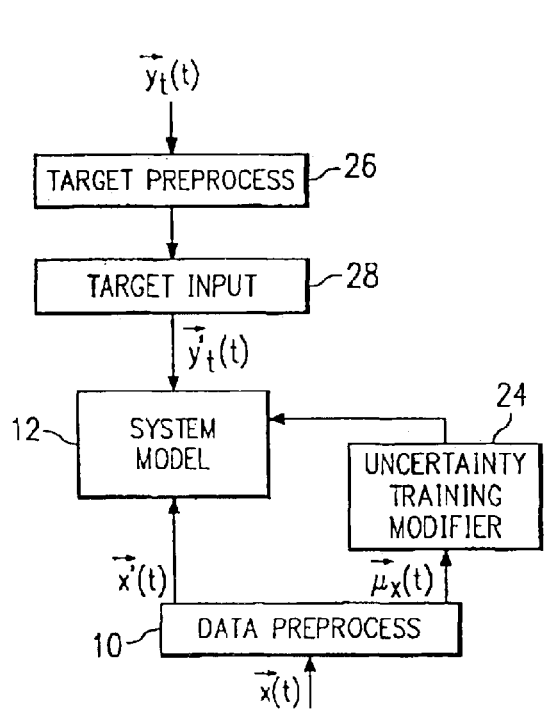
FIGS. 2a and 2c illustrates an overall block diagram of a method for training the system model utilizing the uncertainty generated during data reconciliation.

Referring now to FIG. 2a, there is illustrated one embodiment of a method for training the system model 12 utilizing the uncertainty $\mu(t)$ of the input training data. In general, learning of the system model 12 is achieved through any of a variety of neural network architectures, and algorithms such as Backpropagation, Radial Basis Functions or Gaussian Bars. The learning operation is adjusted such that a pattern with less data in the input space is trained with less importance. In the backpropagation technique, one method is to change the learning rate based on the uncertainty of a given pattern. The input uncertainty vector $\mu_x(t)$ is input to an uncertainty training modifier 24, which provides control signals to the system model 12 during training.

The data pre-processor 10 calculates the data value x'(t) at the desired time "t" from other data values using a reconciliation technique such as linear estimate, spline-fit, box-car reconciliation or more elaborate techniques such as an auto-encoding neural network, described hereinbelow. All of these techniques are referred to as data reconciliation, with the input data x(t) reconciled with the output reconciled data x'(t). In general, x'(t) is a function of all of the raw values x(t) given at present and past times up to some maximum past time, Xmax. That is, $$x_1(t_N), x_2(t_N), \ldots x_n(t_N); x_1(t_{N-1}), x_1(t_{N-2}) \ldots x_1(t_{N-1}); x_1(t_1), x_2(t_1) \ldots x_n(t_1)) \quad (001)$$

where some of the values of $x_i(t_j)$ may be missing or bad.

This method of finding x'(t) using past values is strictly extrapolation. Since the system only has past values available during runtime mode, the values must be reconciled. The simplest method of doing this is to take the next extrapolated value $x'_i(t) = x_i(t_N)$; that is, take the last value that was reported. More elaborate extrapolation algorithms may use past values $x_i(t-\tau_{ij})$, $j \in t(o, \ldots i_{max})$. For example, linear extrapolation would use:

$$) = x_i(t_{N-1}) + \left[\frac{x_i(t_N) - x_i(t_{N-1})}{t_N - t_{N-1}}\right] t; t \quad (002)$$

Polynomial, spline-fit or neural-network extrapolation techniques use Equation 1. (See eg. W. H. Press, "Numerical Recipes", Cambridge University Press (1986), pp. 77–101) Training of the neural net would actually use interpolated values, i.e., Equation 2, wherein the case of interpolation $t_N > t$.

Any time values are extrapolated or interpolated, these values have some inherent uncertainty, $\mu_x(t)$. The uncertainty may be given by a priori measurement or information and/or by the reconciliation technique. An estimate of the uncertainty $\mu_x(t)$ in a reconciled value x'(t) would be:

$$\vec{\mu}_{x'} = \begin{cases} \vec{\mu}_{ox'} + \mu_{1x'} t + \mu_{2x'} t^2 & \mu \leq \mu_{max} \\ \vec{\mu}_{max} & \mu \geq \mu_{max} \end{cases} \quad (003)$$

where $\mu_{max}$ is the maximum uncertainty set as a parameter (such as the maximum range of data) and where:

$\mu_{ox'}$ is the a priori uncertainty $$\mu_{1x'} = \left\langle \left| \frac{d\vec{x}'}{dt} \right| \right\rangle \quad (004)$$

i.e., the local velocity average magnitude and where:

$$\mu_{2x'} = \left\langle \left| \frac{1}{2} \frac{d^2 \vec{x}'}{dt^2} \right| \right\rangle \quad (005)$$

i.e., ½ the local acceleration average magnitude.
A plot of this is illustrated in FIG. 2b.

Once the input uncertainty vector $\mu_x(t)$ is determined, the missing or uncertain input values have to be treated differently than missing or uncertain output values. In this case, the error term backpropagated to each uncertain input is modified based on the input's uncertainty, whereas an error in the output affects the learning of all neuronal connections below that output. Since the uncertainty in the input is always reflected by a corresponding uncertainty in the output, this uncertainty in the output needs to be accounted for in the training of the system model 12, the overall uncertainty of the system, and the validity of the system's output.

The target output y(t) has the uncertainty thereof determined by a target preprocess block 26 which is substantially similar to the data preprocess block 10 in that it fills in bad or missing data. This generates a target input for input to a block 28, which comprises a layer that is linearly mapped to the output layer of the neural network in the system model 12. This provides the reconciled target y'(t).

Figure 2C:
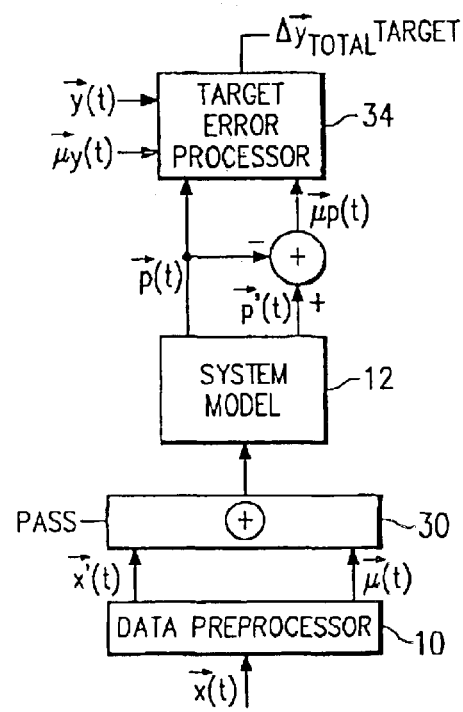
Figure 2B:
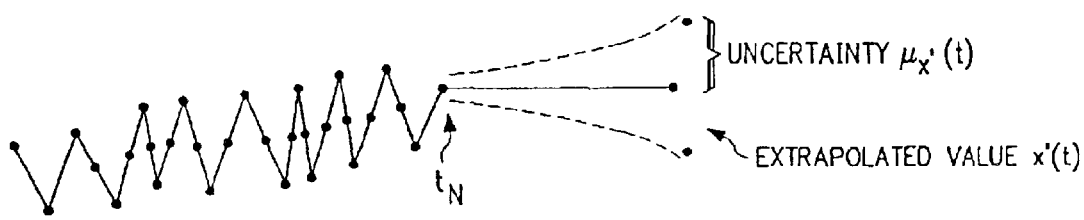
FIG. 2b illustrates an example of reconciliation and the associated uncertainty.

Referring now to FIG. 2c, there is illustrated an alternate specific embodiment wherein a system model 12 is trained on both the reconciled data x'(t) and the uncertainty $\mu_x(t)$ in the reconciled data x'(t). This data is output from the data preprocess block 10 to a summation block 30 that is controlled on various passes through the model to either process the reconciled data x'(t) itself or to process the summation of the reconciled data x'(t) and the uncertainty $\mu_x(t)$. Two outputs result, a predicted output p(t) and an uncertainty predicted output $\mu_p(t)$. These are input to a target error processor block 34, which also receives as inputs the reconciled target output y'(t) and the uncertainty in the reconciled target output $\mu_{y'}(t)$. This generates a value $\Delta y_{total}$. This value is utilized to calculate the modified Total Sum Squared (TSS) error function that is used for training the system model with either a Backpropagation Radial Basis Function or Gaussian Bar neural network.

In operation, a first forward pass is performed by controlling the summation block 30 to process only the reconciled data x'(t) to output the predicted output p(t). In a second pass, the sum of the reconciled data input x'(t) and the uncertainty input $\mu_{x'}(t)$ is provided as follows:

$$(t) + \vec{\mu}_{x'(t)} = (x'_1 + \mu_{x'_1}, x'_2 + \mu_{x'_2}, \ldots, x'_n + \mu) \quad (006)$$

This results in the predicted output p'(t). The predicted uncertainty $\mu_p(t)$ is then calculated as follows:

$$\vec{p}'(t) - \vec{p}(t) = (p'_1 - p_1, p'_2 - p_2, \ldots, p'_m) \quad (007)$$

The total target error $\Delta y_{total}$ is then set equal to the sum of the absolute values of $\mu_p(t)$ and $\mu_{y'}(t)$ as follows:

$$\Delta \vec{y}_{total} = (|\mu_{p1}| + |\mu_{y'1}|, |\mu_{p2}| + |\mu_{y'2}|, \ldots) \quad (008)$$

The output error function, the TSS error function, is then calculated with the modified uncertainty as follows:

$$E = \sum_{i=1}^{N_{PATS}} (\vec{y}_i - \vec{p}_i)^2 \left(1 - \frac{\Delta \vec{y}_{total_i}}{\Delta \vec{y}_{max_i}}\right) \quad (009)$$

where $N_{PATS}$ is the number of training patterns.
For Backpropagation training, the weights $W_{ij}$ are updated as follows:

$$W_{ij} = \begin{cases} -\eta \frac{\partial E}{\partial W_{ij}} & j \notin \text{input} \\ -\eta \frac{\partial E}{\partial W_{ij}}\left(1 - \left(\frac{|\mu_{x'_j}|^2}{|\mu_{x'_j max}|^2}\right)\right) & j \in \text{input} \end{cases} \quad (010)$$

As such, the network can now have the weights thereof modified by an error function that accounts for uncertainty.

For neural networks that do not utilize Backpropagation, similar behavior can be achieved by training the system model through multiple passes through the same data set where random noise is added to the input patterns to simulate the effects of uncertainty in these patterns. In this training method, for each x'(t) and associated $\mu_{x'}(t)$ a random vector can be chosen by choosing each x"$_i$ as x"$_i$=x'$_i$+n$_i$, wherein n$_i$ is a noise term chosen from the distribution:

$$e^{\left(-x_i'^2 / 2\mu_{x_i'}^2\right)} \quad (011)$$

In this case:

$$\vec{\mu}_p(t) = f(\vec{x}') - f(\vec{x}") \quad (012)$$

Where f(x(t)) is the system model producing this system predicted output p(t).

Figure 3A:
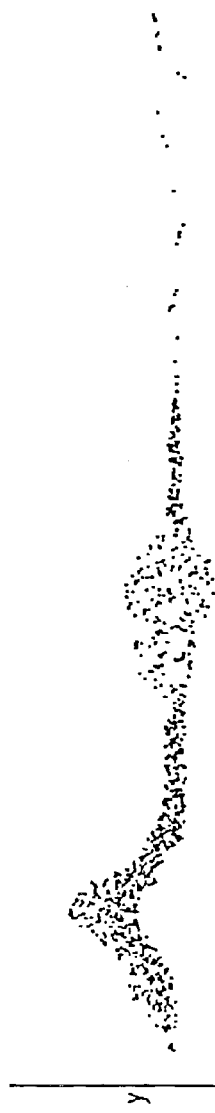
FIGS. 3a–3c illustrate data patterns representing the data distribution, the prediction error and the validity level.
Figure 3B:
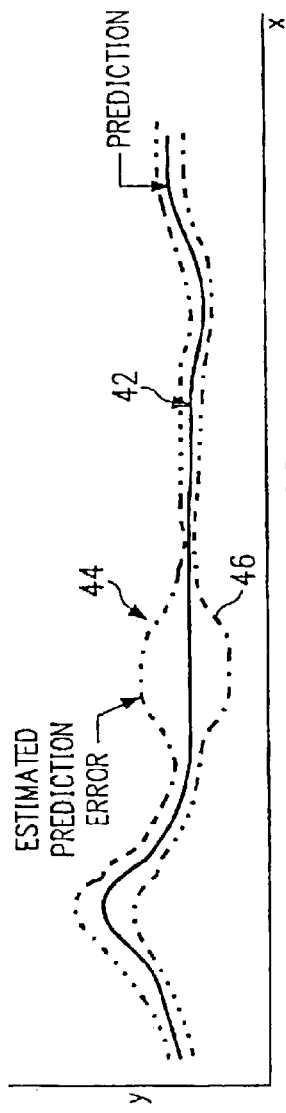
Figure 3C:
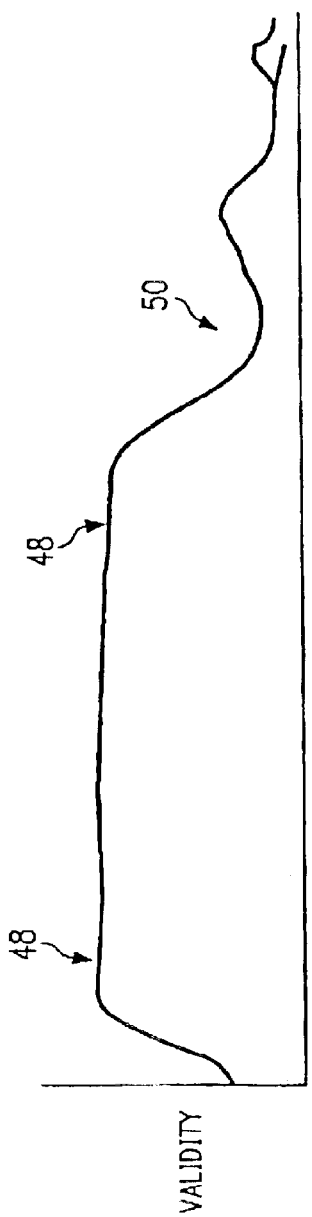

Referring now to FIGS. 3a–3c, there are illustrated plots of the original training data, the system-model prediction and the prediction error, and the validity, respectively. In FIG. 3a, the actual data input-target patterns are illustrated. It can be seen that the data varies in density and variance across the x-axis. Once the system model is trained, it yields a prediction, y (x), line 42. The system-model has an inherent prediction-error (due to inaccuracies in the training data). These prediction errors are illustrated by two dotted lines 44 and 46 that bound on either side of the predicted value on line 42. This represents basically the standard deviation of the data about the line 42. The validity is then determined, which is illustrated in FIG. 3c. The validity is essentially a measure of the amount of training data at any point. It can be seen that the initial point of the curve has a high validity value, illustrated by reference numeral 48, and the latter part of the curve where a data was missing has a low level, as represented by reference numeral 50. Therefore, when one examines a neural network trained by the data in FIG. 3a, one would expect the reliability or integrity of the neural network to be high as a function of the training data input thereto whenever a large amount of training data was present.

Figure 4A:
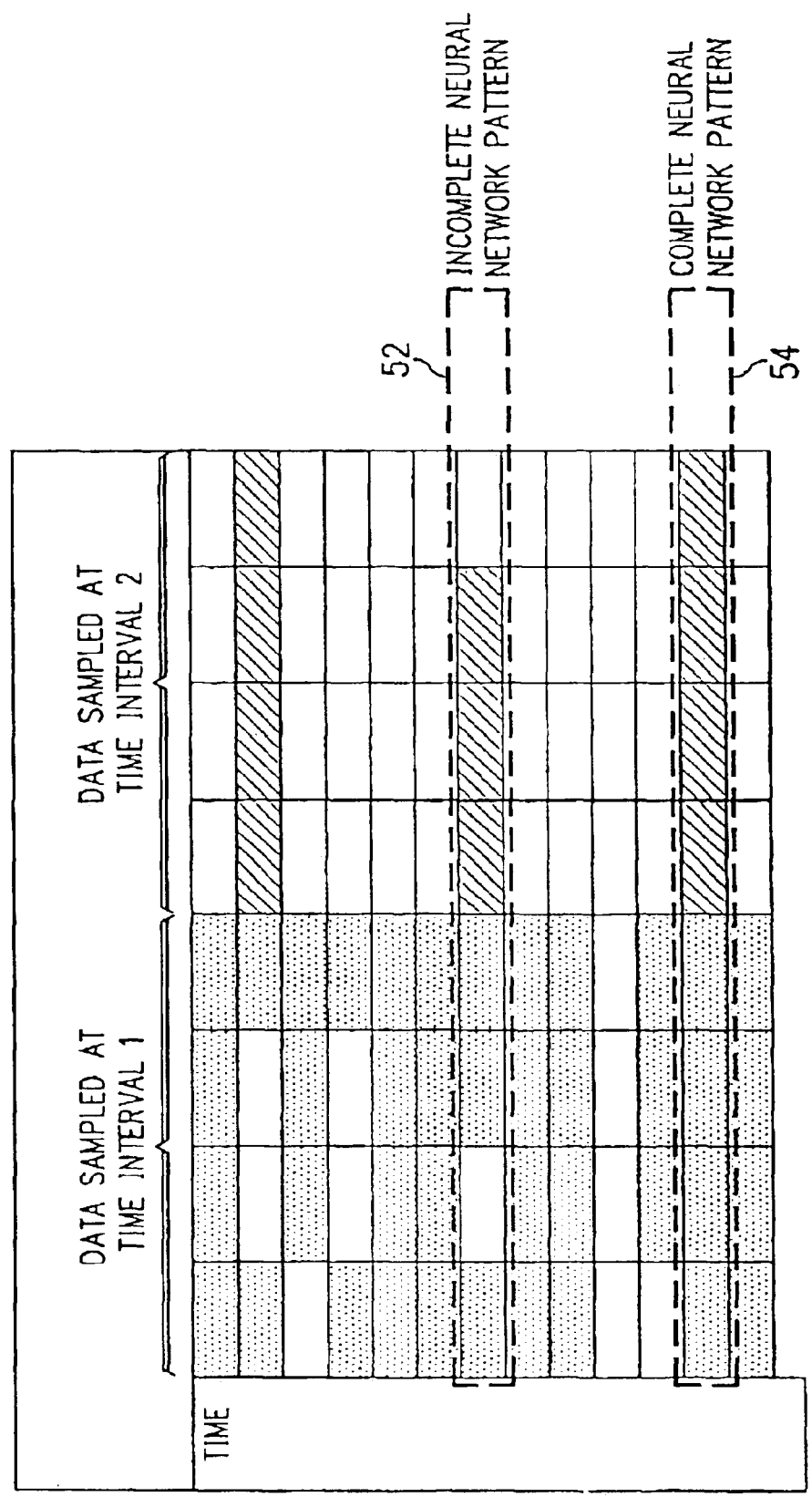
FIG. 4a illustrates a diagrammatic view of a data pattern sampled at two intervals illustrating a complete neural network pattern.

Referring now to FIG. 4a, there is illustrated a data table with bad, missing, or incomplete data. The data table consists of data with time disposed along a vertical scale and the samples disposed along a horizontal scale. Each sample comprises many different pieces of data with two data intervals illustrated. It can be seen that when the data is examined for both the data sampled at the time interval 1 and the data sampled at the time interval 2, that some portions of the data result in incomplete patterns. This is illustrated by a dotted line 52, where it can be seen that some data is missing in the data sampled at time interval 1 and some is missing in time interval 2. A complete neural network pattern is illustrated box 54, where all the data is complete. Of interest is the time difference between the data sampled at time interval 1 and the data sampled at time interval 2. In time interval 1, the data is essentially present for all steps in time, whereas data sampled at time interval 2 is only sampled periodically relative to data sampled at time interval 1. As such, the reconciliation procedure fills in the missing data and also reconciles between the time samples in time interval 2 such that the data is complete for all time samples for both time interval 1 and time interval 2.

The neural network models that are utilized for time-series prediction and control require that the time-interval between successive training patterns be constant. Since the data that comes in from real-world systems is not always on the same time scale, it is desirable to time-merge the data before it can be used for training or running the neural network model. To achieve this time-merge operation, it may be necessary to extrapolate, interpolate, average or compress the data in each column over each time-region so as to give an input value x(t) that is on the appropriate time-scale. The reconciliation algorithm utilized may include linear estimates, spline-fits, boxcar algorithms, etc., or more elaborate techniques such as the auto-encoding network described hereinbelow. If the data is sampled too frequently in the time-interval, it will be necessary to smooth or average the data to get a sample on the desired time scale. This can be done by window averaging techniques, sparse-sample techniques or spline techniques.

Figure 4B:
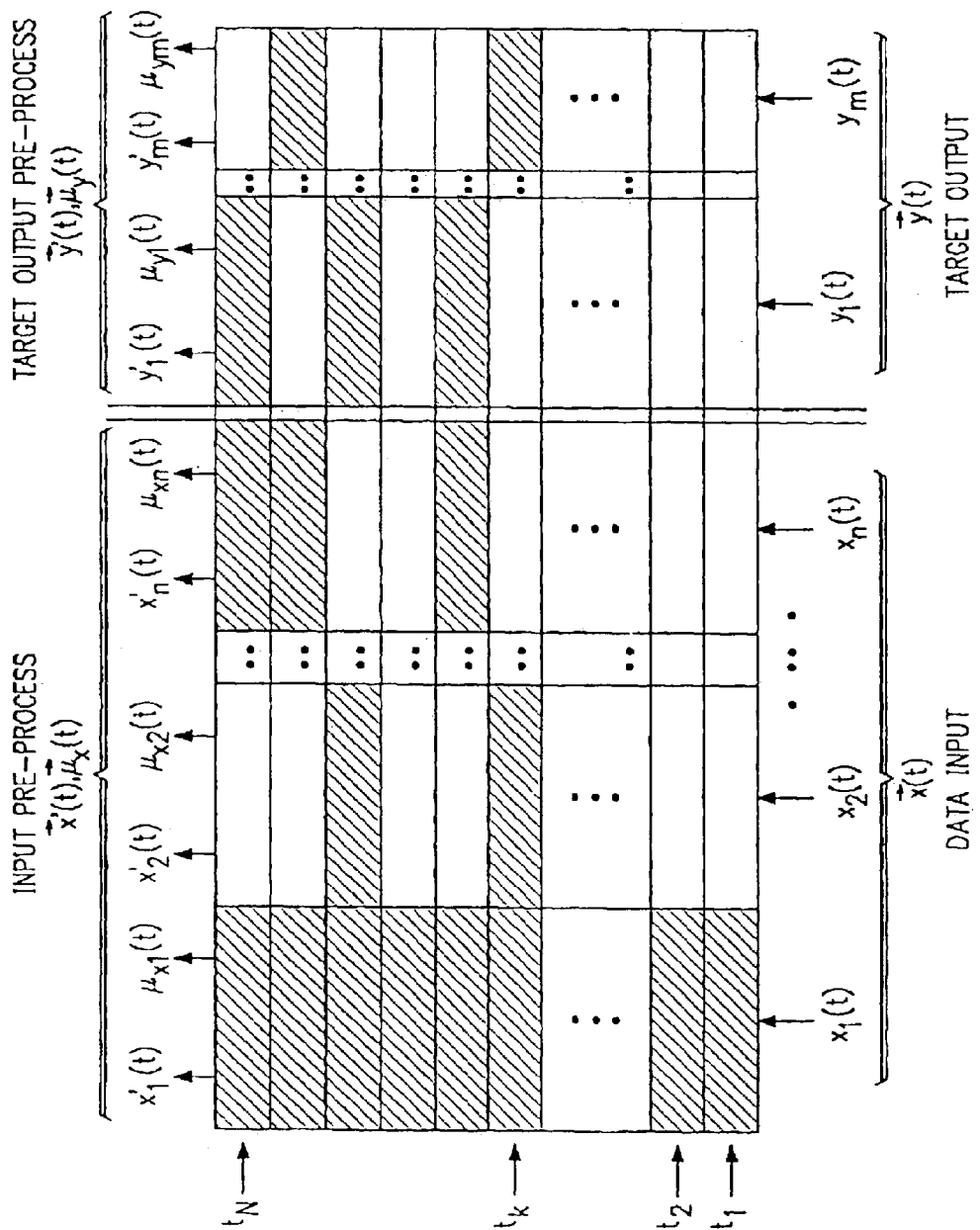
FIG. 4b illustrates a diagrammatic view of a data pattern illustrating time merging of data.

Referring now to FIG. 4b, there is illustrated an input data pattern and target output data pattern illustrating the pre-process operation for both preprocessing input data to provide time merged output data and also pre-processing the target output data to provide pre-processed target output data for training purposes. The data input x(t) is comprised of a vector with many inputs, $x_1(t), x_2(t), \ldots, x_n(t)$, each of which can be on a different time scale. It is desirable that the output x'(t) be extrapolated or interpolated to insure that all data is present on a single time scale. For example, if the data at $x_1(t)$ were on a time scale of one sample every second, a sample represented by the time $t_k$ and the output time scale were desired to be the same, this would require time merging the rest of the data to that time scale. It can be seen that the data $x_2(t)$ occurs approximately once every three seconds, it also being noted that this may be asynchronous data, although it is illustrated as being synchronized. The data buffer in FIG. 4b is illustrated in actual time. However, the data output as $x_1'(t)$ is reconciled with an uncertainty $\mu_{x_1'}(t)$ since the input time scale and the output time scale are the same, there will be no uncertainty. However, for the output $x_2'(t)$, the output will need to be reconciled and an uncertainty $\mu_{x_2'}(t)$ will exist. The reconciliation could be as simple as holding the last value of the input $x_2(t)$ until a new value is input thereto, and then discarding the old value. In this manner, an output will always exist. This would also be the case for missing data. However, a reconciliation routine as described above could also be utilized to insure that data is always on the output for each time slice of the vector x'(t). This also is the case with respect to the target output which is preprocessed to provide the preprocessed target output y'(t).

Figure 5:
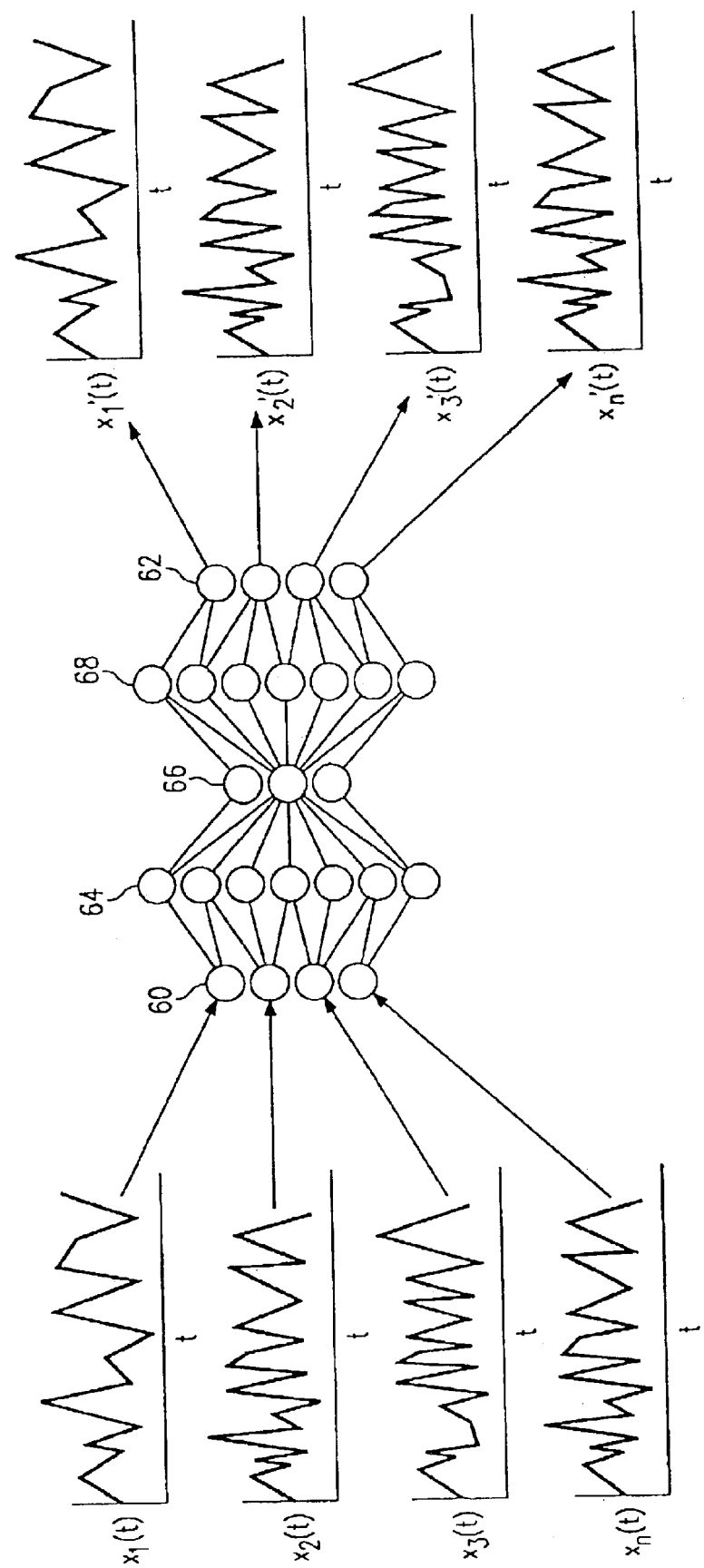
FIG. 5 illustrates an auto-encoding network for reconciling the input data to fill in bad or missing data.

Referring now to FIG. 5, there is illustrated a diagrammatic view of an auto-encoding network utilized for the reconciliation operation. The network is comprised of an input layer of input nodes 60 and an output layer of output nodes 62. Three hidden layers 64, 66 and 68 are provided for mapping the layer 60 to the output layer 62 through a non-linear mapping algorithm. The input data patterns $x_1(t)$, $x_2(t)$, ..., $x_n(t)$ are input thereto, reconciled and reproduced over regions of missing data to provide the output data pattern $x_1'(t)$, $x_2'(t)$, $x_3'(t)$, ..., $x_n'(t)$. This network can be trained via the backpropagation technique. Note that this system will reconcile the data over a given time base even if the data were not originally sampled over that time base such that data at two different sampling intervals can be synchronized in time.

The techniques described above involve primarily building, training and running a system model on data that may have missing parts, be on the wrong time-sale increment and/or possesses bad data points. The primary technique involves reconciliation over the bad or missing data and/or time-merging the data. However, once a model is built and trained, there are two other factors that should be taken into account before the model can be used to its full extent to solve a real-world problem. These two factors are the prediction accuracy of the model and the model validity. The model typically does not provide an accurate representation of the dynamics of the process that is modeled. Hence, the prediction output by the model will have some prediction-error e(t) associated with each input pattern x(t), where:

$$\vec{e}(t) = \vec{y}(t) - \vec{p}(t) \tag{013}$$

This provides a difference between the actual output at time "t" and the predicted output at "t". The prediction error e(t) can be used to train a system that estimates the system-model accuracy. That is, a structure can be trained with an internal representation of the model prediction error e(t). For most applications, predicting the magnitude $\|e(t)\|$ of the error (rather than the direction) is sufficient. This prediction-error model is represented hereinbelow.

Figure 6:
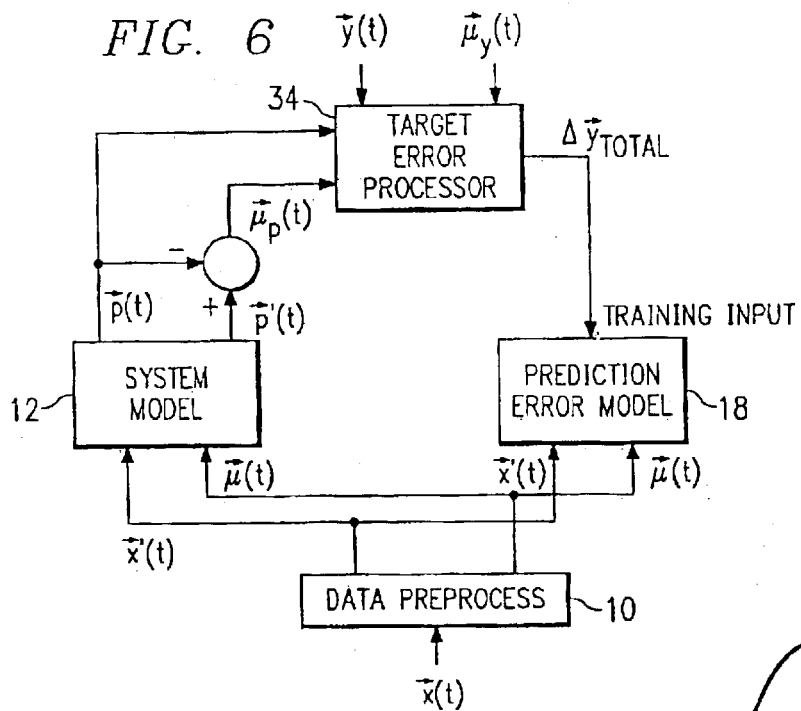
FIG. 6 illustrates a block diagram of the training operation for training the model.

Referring now to FIG. 6, there is illustrated a block diagram of the system for training the prediction-error model 18. The system of FIG. 2c is utilized by first passing the reconciled input data x'(t) and the uncertainty $\mu_{x'}(t)$ through the trained system model 12, this training achieved in the process described with respect to FIG. 2c. The target error $\Delta y_{total}$ is calculated using the target error processor in accordance with the same process illustrated with respect to Equation 8, in addition to $\Delta y$ as a function of "y". This is then input as a target to the prediction error model 18 with the inputs being the reconciled input data x'(t) and the uncertainty $\mu_{x'}(t)$. The prediction-error model can be instantiated in many ways, such as with a lookup table, or with a neural network. If instantiated as a neural network, it may be trained via conventional Backpropagation, Radial Basis functions, Gaussian Bars, or any other neural network training algorithm.

The measurement of the validity of a model is based primarily on the historical training data distribution. In general, neural networks are mathematical models that learn behavior from data. As such, they are only valid in the regions of data for which they were trained. Once they are trained and run in a feed-forward or test mode, (in a standard neural network) there is no way to distinguish, using the current state of the model lone, between a valid data point (a point in the region where the neural network was trained) versus an invalid data point (a point in a region where there was no data). To validate the integrity of the model prediction, a mechanism must be provided for keeping track of the model's valid regions.

Figure 7:
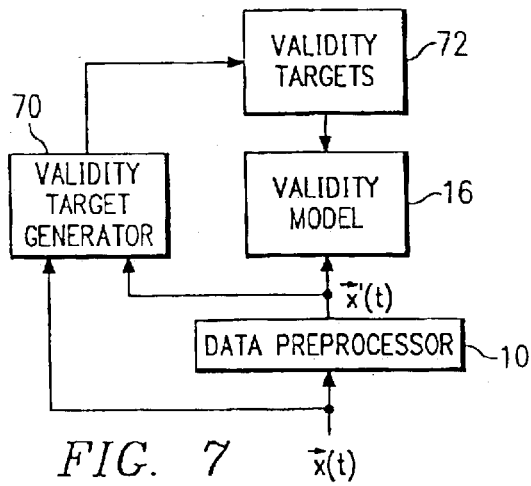
FIG. 7 illustrates an overall block diagram for training the validity model.

Referring now to FIG. 7, there is illustrated an overall block diagram of the processor for training the validity model 16. The data preprocess block 10 is utilized to provide the reconciled input data x'(t) to the input of the validity model 16. The input data x(t) and the reconciled input data x'(t) are input to a validity target generator 70 to generate the validity parameters for input to a layer 72.

A validity measure v(x) is defined as:

$$v(\vec{x}) = S\left(\sum_{i=1}^{N_{PATS}} a_i h_i(\vec{x}, \vec{x}_i) - b_i\right) \tag{014}$$

where: v(x) is the validity of the point x
S is a saturating, monotonically increasing function such as a sigmoid:

$$S(z) = \frac{1}{1 + e^{-z}} \tag{015}$$

$a_i$ is a coefficient of importance, a free parameter,
$h_i$ is a localized function of the data x(t) and the training data point $x_i(t)$,
$N_{pats}$ is the total number of training patterns, and
$b_i$ is a bias parameter.

The parameter $h_i$ is chosen to be a localized function of the data that is basically a function of the number of points in a local proximity to the point x(t). As a specific embodiment, the following relationship for $h_i$ is chosen:

$$h_i(\vec{x}_i, \vec{x}_i) = \begin{cases} e^{-(\vec{x}-\vec{x}_i)^2/\sigma_i^2} & \|\vec{x}-\vec{x}_i\| < \\ o & \|\vec{x}-\vec{x}_i\| \geq \alpha \end{cases} \tag{016}$$

Figure 8A:
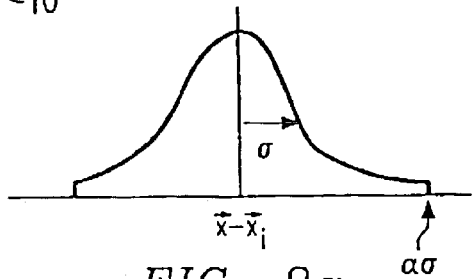
FIGS. 8a and 8b illustrate examples of localized functions of the data for use with training the validity model.
Figure 8B:
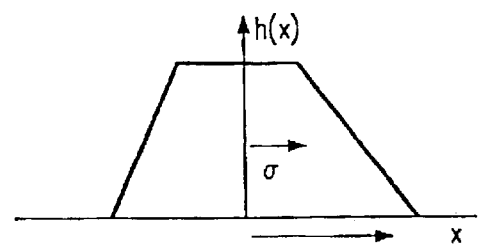

The resultant function is illustrated in FIG. 8a with the function cut of at$\alpha\sigma$ so that far-away points do not contribute. Other functions such as the one illustrated in FIG. 8b could also be used.

Figure 9:
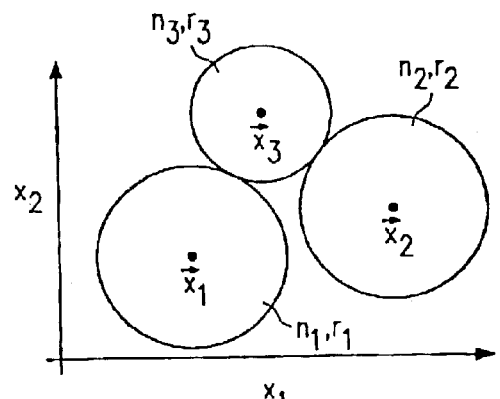
FIG. 9 illustrates a diagrammatic view of radial basis function centers in a two-dimensional space.

Referring now to FIG. 9, there is illustrated an input space represented by inputs $x_1$ and $x_2$. It can be seen that there are three regions, each having centers $x_1$, $x_2$ and $X_3$, each having a given number of points $n_1$, $n_2$ and $n_3$, respectively, and a radius $r_1$, $r_2$ and $r_3$. The centers of the regions are defined by the clustering algorithms with the number of points determined therein.

Figure 10:
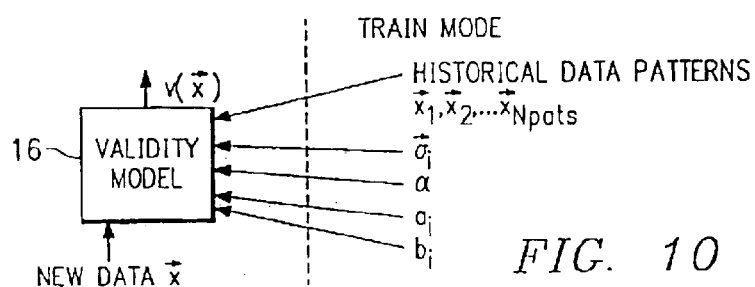
FIG. 10 illustrates a diagrammatic view of the validity function.

Referring now to FIG. 10, there is illustrated a representation of the validity function wherein the validity model 16 is illustrated as having the new data x(t) input thereto and the output v(x(t)) output therefrom. A dotted line is provided to the right of the validity model 16 illustrating the training mode wherein the inputs in the training mode are the historical data patterns $x_1(t)$, $x_2(t)$, ... $x_{Npats}(t)$, $\sigma_i$, $\alpha$, $a_i$, $b_i$. In a specific embodiment, the values in the above are chosen such that $a_i=1$, $b_i=2$, for all i, $\sigma_i=0.1$, $\alpha=3$, for all i.

The Equation 14 can be difficult to compute, so it is more efficient to break the sum up into regions which are defined as follows:

$$\left\{ \sum_{i \in Cell_i} a_i h_i(\vec{x}, \vec{x}_i) + \sum_{j \in Cell_j} a_j h_j(\vec{x}, \vec{x}_j) + \right. \tag{017}$$

where the cells are simple geometric divisions of the space, as illustrated in FIG. 10, which depicts a test pattern.

Figure 11:
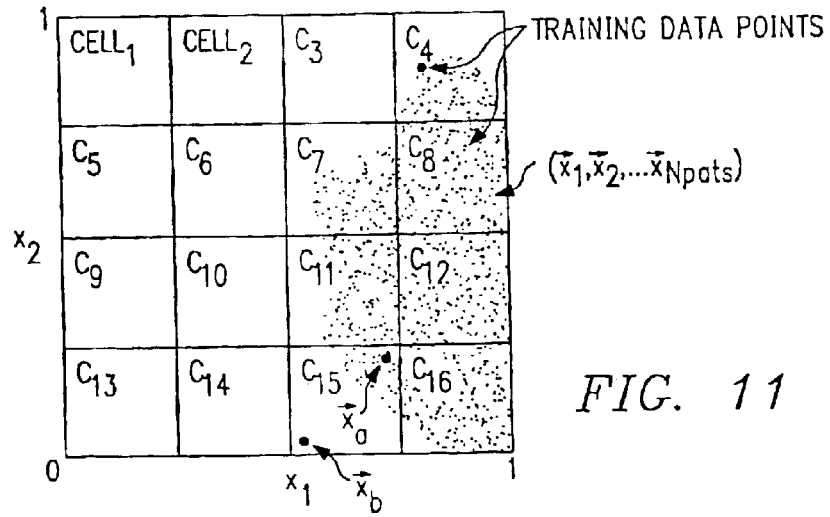
FIG. 11 illustrates distribution of training data and two test patterns for $x_a$ and $x_b$.

In FIG. 11, the test pattern $x_a(t)$ has a validity that is determined by cells C15, C16, C12 and C11 as long as the cell-size is greater than or equal to the cutoff $\alpha\sigma$, where the data point $x_b(t)$ is only influenced by cell C15 and C14. Hence, the algorithm for finding the validity is straightforward.

1) Train system model on training patterns $(x_1, x_2, x_3, \ldots, x_{Npats})$

2) Train validity model by keeping track of $x_1 \ldots x_{Npats}$, e.g., via a binary tree or K-d tree.

3) Partition the data space into cells $C_1, C_2 \ldots C_{Ncells}$ (eg. K-d tree)

4) Determine which cell the new data point falls into, eg. cell-index $(x)=(kx_1)(kx_2) \ldots (kx_n)$, if the cells are equally divided into k partitions/dimension and $x_i \epsilon (0,1)$ 5) Compute sum in cell 6) Compute sum in n-neighbors.

7) The validity function will then be defined as:

$$v(\vec{x}') = \sum_{Cell} \vec{x}' + f(d_i) \sum_{Neighbors} \tag{018}$$

where $d_i$ is the distance from x' to neighbor i, and $f(d_i)$ is a decreasing function of $d_i$.

Again, Equation 18 can be difficult to calculate. Furthermore, it may be the case that few data points fall into the individual cells. A useful approximation of the full sum may be made by including only those neighbors with large $f(d_i)$. A second, simpler, and faster way of computing the sums in Equation 18 is to approximate the sums by averaging all points in a region as follows:

$$') \cong S(N_1 a_1 h_1(\vec{x}', \vec{x}_1) + N_2 a_2 h_2(\vec{x}', \vec{x}_2) - \tag{019}$$

$$v(\vec{x}') \cong S\left( \sum_{Regions} N_i a_i h_i(\vec{x}', \vec{x}_i) - b \right) \tag{020}$$

The region centers $x_i$ can be selected as the centers of the cells $x_i$, or as the centers of k-d tree cells, or as the centers of Radial Basis functions that are selected via a k-means clustering algorithm.

Figure 12:
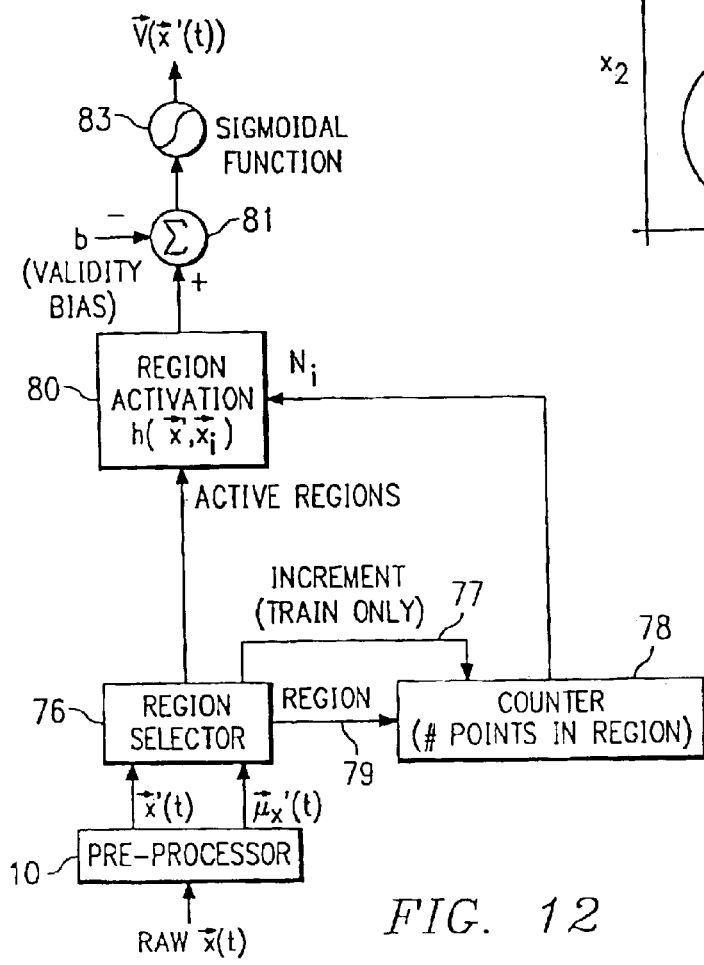
FIG. 12 illustrates an overall block diagram for generating the validity targets that are utilized during the training of the validity model.

Referring now to FIG. 12, there is illustrated a block diagram of the validity model 16 for receiving the output of the pre-processor 10 and generating the validity value v(x'(t)). As described above, the output of the preprocessor 10 comprises both the reconciled data x'(t) and the uncertainty $\mu_{x'}(t)$. This is input to a region selector 76 which is operable to determine which region of the test pattern the reconciled data resides in. During training, a counter 78 is incremented to determine the number of points in the region over which the system model 12 was trained. This is stored on a region-by-region basis and, during a run mode, the incrementing operation that is controlled by a line 77 is disabled and only a region line 79 is activated to point to the region determined by the region selector 76. The output of the counter comprises the number of points in the region $N_i$, which is then input to a region activation block 80. The block 80 provides the function h(x'(t)), $x_i(t)$), which, as described above, is the localized function of the data x'(t) and the training data points x'$_i$(t). The output of the region activation block 80 is input to a difference circuit 81 to subtract therefrom a validity bias value "b". This is essentially an offset correction which is an arbitrary number determined by the operator. The output of the difference circuit 81 is input to a sigmoidal function generator that provides the output v(x'(t)). The sigmoidal function provides a sigmoidal activation value for each output of the vector v(x'(t)).

In operation, the validity model 16 of FIG. 12 allows for on-the-fly calculation of the validity estimation. This requires for the calculation the knowledge of the number of points in each region and knowledge of the region in which the input pattern resides. With this information, the estimation of the validity value can be determined. During the training mode, the increment line 77 is enabled such that the number of points in each region can be determined and stored in the counter 78. As described above, the run mode only requires output of the value $N_i$.

In the embodiment of FIG. 7, the validity target generator 70 could utilize the structure of FIG. 12 to calculate a target output for each value of x(t) input to the preprocessor 10. This would allow the validity model 16 to be realized with a neural network, which is then trained on the validity targets and the input data in accordance with a training algorithm such as backpropagation.

In summary, there has been provided a method for accounting for bad or missing data in an input data sequence utilized during the run mode of a neural network and in the training mode thereof. The bad or missing data is reconciled to provide a reconciled input data time series for input to the neural network that models the system. Additionally, the error that represents uncertainty of the predicted output as a function of the uncertainty of the data, or the manner in which the data behaves about a particular data point or region in the input space, is utilized to control the predicted system output. The uncertainty is modelled during the training phase in a neural network and this network utilized to provide a prediction of the uncertainty of the output. This can be utilized to control the output or modify the predicted system output value of the system model. Additionally, the relative amount of data that was present during training of the system is also utilized to provide a confidence value for the output. This validity model is operable to receive the reconciled data and the uncertainty to predict a validity value for the output of the system model. This is also used to control the output. Additionally, the uncertainty can be utilized to train the system model, such that in regions of high data uncertainty, a modification can be made to the network to modify the learning rate as a function of the desired output error during training. This output error is a function of the uncertainty of the predicted output.

Although the preferred embodiment has been described in detail, it should be understood that various changes, substitutions and alterations can be made therein without departing from the spirit and scope of the invention as defined by the appended claims.

What is claimed is:

1. A network for estimating the error in the prediction output space of a predictive system model operating over a prediction input space to then control the output of the predictive system model, comprising:
    an input for receiving an input vector comprising a plurality of input values that occupy the prediction input space;
    an output for outputting an output prediction error vector that occupies an output space corresponding to the prediction output space of the predictive system model;
    a processing layer for mapping the prediction input space to the prediction output space through a representation of the prediction error in the predictive system model to provide said output prediction error vector; and
    a controller for modifying the output of the predictive system model as a function of said output error prediction vector.

2. The network of claim 1, and further comprising:
    a pre-process input for receiving an unprocessed data input vector having associated therewith unprocessed data associated with substantially the same input space as said input vector, said unprocessed data input vector having errors associated with the associated unprocessed data in select portions of the prediction input space; and
    a data preprocessor for processing the unprocessed data in the unprocessed data input vector to minimize the errors therein to provide said input vector on an output.

3. The network of claim 2, wherein said unprocessed data input vector is comprised of data having portions thereof that are unusable and said data preprocessor comprises a reconciliation device for reconciling the unprocessed data to replace the unusable portions with reconciled data.

4. The network of claim 2, wherein said data prepossessor is operable to calculate and output the uncertainty for each value output by said data preprocessor.

5. The network of claim 1, wherein the predictive system model comprises a non-linear model having an input for receiving the input vector that is within the prediction input space and an output for outputting a predicted output vector within the prediction output space, said non-linear model mapping the prediction input space to the prediction output space through a non-linear representation of a system.

6. The network of claim 5, wherein the predictive system model is trained on a set of training data having uncertainties associated therewith and wherein said processing layer is operable to map the prediction input space to the prediction output space through a representation of the combined prediction error in the predictive system model and the prediction error in the set of training data due to the uncertainty in the set of training data.

7. The network of claim 6, wherein said non-linear representation is a trained representation that is trained on a finite set of input data within the input space in accordance with a predetermined training algorithm and further comprising a validity model for providing a representation of the validity of the predicted output vector of the system model for a given value of the input vector within the input space, said validity model having:
    an input for receiving the input vector within the input space;
    an output for outputting a validity output vector corresponding to the output space; and
    a validity processor for generating said validity output vector in response to input of said input vector and the location of said input vector in the input space, the value of said validity output vector corresponding to the amount of training data on which the system model was trained in the region of the input space about the value of the input vector.

8. The network of claim 7, and further comprising:
    a plurality of decision thresholds for defining predetermined threshold values for the validity output vector;
    an output control for effecting a change in the value of said predicted output vector from the predictive system model; and
    a decision processor for receiving said validity output vector and comparing said validity output vector to said decision thresholds, and operating said output control to effect said change in the value of said predicted output vector when the value of said validity output vector meets a predetermined relationship with respect to said decision thresholds.

9. The network of claim 5 and further comprising:
    a plurality of decision thresholds for defining predetermined threshold values for said output prediction error vector;
    an output control for effecting a change in the value of said predicted output vector from the predictive system model; and
    a decision processor for receiving said output prediction error vector and comparing it to said decision thresholds and operating said output control to effect said change on the value of said predicted output vector when the value of said output prediction error vector meets a predetermined relationship with respect to said decision thresholds.

10. A network for providing a measure of the validity in the prediction output space of a predictive system model that provides a prediction output and operates over a prediction input space to then control the output of the predictive system model, comprising:
    an input for receiving an input vector comprising a plurality of input values that occupy the prediction input space;
    an output for outputting a validity measure output vector that occupies an output space corresponding to the prediction output space of the predictive system model;
    a processing layer for mapping the prediction input space to the prediction output space through a representation of the validity of the system model that was learned on a set of training data, the representation of the validity of the system model being a function of the distribution of the training data in the prediction input space that was input thereto during training to provide a measure of the validity of the system model prediction output; and a controller for modifying the output of the predictive system model as a function of said validity measure output vector.

11. The network of claim 10, and further comprising:

a pre-process input for receiving an unprocessed data input vector having associated therewith unprocessed data associated with substantially the same input space as said input vector, said unprocessed data input vector having errors associated with the associated unprocessed data in select portions of the prediction input space; and a data preprocessor for processing the unprocessed data in the unprocessed data input vector to minimize the errors therein to provide said input vector on an output.

12. The network of claim 11, wherein said unprocessed data input vector is comprised of data having portions thereof that are unusable and said data preprocessor comprises a reconciliation device for reconciling data to replace the unusable portions with reconciled data.

13. The network of claim 12, wherein said data preprocessor is operable to calculate and output the uncertainty for each value of reconciled data output by said data preprocessor.

14. The network of claim 10, wherein the predictive system model comprises a non-linear model having an input for receiving the input vector that is within the prediction input space and an output for outputting a predicted output vector within the prediction output space, said non-linear model mapping the prediction input space to the prediction output space through a non-linear representation of a system.

15. The network of claim 14, and further comprising:

a plurality of decision thresholds for defining predetermined threshold values for said validity measure output vector;

an output control for effecting a change in the value of said predicted output vector from the predictive system model; and a decision processor for receiving said validity measure output vector and comparing it to said decision threshold and operating said output control to effect said change on the value of said predicted output vector when the value of said validity measure output vector meets a predetermined relationship with respect to said decision threshold.

16. The network of claim 10, wherein said processing layer comprises:

a memory for storing a profile of the training data density over the input space; and a processor for processing the location of the input data in the input space and the density of the training data at said location as defined by said stored profile to generate said validity measure output vector as a function of the distribution of said training data proximate to the location in the input space of the input data.

17. A method for estimating the error in the prediction output space of a predictive system model over a prediction input space to then control the output of the predictive system model, comprising the steps of:

receiving an input vector comprising a plurality of input values that occupy the prediction input space;

outputting an output prediction error vector that occupies an output space corresponding to the prediction output space of the predictive system model;

mapping the prediction input space to the prediction output space through a representation of the prediction error in the predictive system model to provide the output prediction error vector in the step of outputting; and a controller for modifying the output of the predictive system model as a function of the output error prediction vector.

18. The method of claim 17, and further comprising the steps of:

receiving an unprocessed data input vector having associated therewith unprocessed data associated with substantially the same input space as the input vector, the unprocessed data input vector having errors associated with the associated unprocessed data in select portions of the prediction input space; and processing the unprocessed data in the unprocessed data vector to minimize the errors therein to provide the input vector on an output.

19. The method of claim 18, wherein the step of receiving an unprocessed data input vector comprises receiving an unprocessed data input vector that is comprised of data having portions thereof that are unusable and the step of processing the unprocessed data comprises reconciling the unprocessed data to replace the unusable portions with reconciled data.

20. The method of claim 19, wherein the step of processing the data is further operable to calculate and output the uncertainty for each value of the reconciled data output by the step of processing.

* * * * *